(12) United States Patent
Nakayama

(10) Patent No.: US 7,912,318 B2
(45) Date of Patent: Mar. 22, 2011

(54) DATA TRANSFORM APPARATUS AND CONTROL METHOD THEREOF

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 12/521,204

(22) PCT Filed: Oct. 6, 2008

(86) PCT No.: PCT/JP2008/068513
§ 371 (c)(1),
(2), (4) Date: Jun. 25, 2009

(87) PCT Pub. No.: WO2009/057439
PCT Pub. Date: May 7, 2009

(65) Prior Publication Data
US 2010/0104215 A1      Apr. 29, 2010

(30) Foreign Application Priority Data

Oct. 29, 2007  (JP) .................................. 2007-280941
Sep. 3, 2008   (JP) .................................. 2008-226378

(51) Int. Cl.
*G06K 9/36*     (2006.01)
*H04N 11/02*    (2006.01)
(52) U.S. Cl. .................... 382/276; 375/240.18; 382/181
(58) Field of Classification Search .................. 382/169,
382/233, 238, 239, 246, 248, 250, 276, 277,
382/280, 281, 302; 348/254, 580, 671; 375/240.2,
375/240.18, 258; 704/269
See application file for complete search history.

(56) References Cited

U.S. PATENT DOCUMENTS 5,581,373 A   12/1996  Yoshida ........................ 358/476
5,801,650 A    9/1998  Nakayama ........................ 341/67
(Continued)

FOREIGN PATENT DOCUMENTS

JP           2003-258645 A        9/2003
(Continued)

OTHER PUBLICATIONS

Komatsu, K., et al., "Lossless 2D Discrete Walsh-Hadamard Transform", IEEE International Conference on Acoustics, Speech, and Signal Processing, 2001 (ICASSP '01), Conference Proceedings, pp. 1917-1920 (2001).

(Continued)

*Primary Examiner* — Abolfazl Tabatabai
(74) *Attorney, Agent, or Firm* — Fitzpatrick, Cella, Harper & Scinto

(57) ABSTRACT

This invention provides a lossless 4-point Hadamard transform circuit which can minimize the number of times of addition/subtraction calculations, and reduce the number of times of round processing required to convert data including a fractional part into an integer. To this end, a DC coefficient generating unit summates four input data, and shifts the summation result 1 bit to the right to halve the summation result and to round the halved result by truncating a fractional part of the result. This 1-bit shift right result is output as a DC coefficient. An intermediate data generating unit generates, as intermediate value, a difference value between one input data of the four input data and the DC coefficient obtained by the DC coefficient generating unit. An AC coefficient generating unit generates three AC coefficients by adding the intermediate data generated by the intermediate data generating unit to other three input data.

7 Claims, 13 Drawing Sheets

U.S. PATENT DOCUMENTS

| | | | |
|---|---|---|---|
| 5,818,970 A | 10/1998 | Ishikawa et al. | 382/248 |
| 5,841,381 A | 11/1998 | Nakayama | 341/67 |
| 5,986,594 A | 11/1999 | Nakayama et al. | 341/107 |
| 6,408,102 B1 | 6/2002 | Nakayama | 382/246 |
| 6,549,676 B1 | 4/2003 | Nakayama et al. | 382/246 |
| 6,553,143 B2 | 4/2003 | Miyake et al. | 382/239 |
| 6,560,365 B1 * | 5/2003 | Nakayama et al. | 382/233 |
| 6,567,562 B1 | 5/2003 | Nakayama et al. | 382/246 |
| 6,711,295 B2 | 3/2004 | Nakayama et al. | 382/232 |
| 6,865,299 B1 | 3/2005 | Nakayama | 382/246 |
| 6,898,310 B1 | 5/2005 | Ohmi et al. | 382/166 |
| 6,952,501 B2 | 10/2005 | Nakayama | 382/243 |
| 6,996,593 B2 | 2/2006 | Nakayama | 708/316 |
| 7,106,911 B2 | 9/2006 | Ohta et al. | 382/251 |
| 7,127,115 B2 * | 10/2006 | Osawa et al. | 382/239 |
| 7,194,140 B2 * | 3/2007 | Ito et al. | 382/251 |
| 7,227,998 B2 | 6/2007 | Nakayama et al. | 382/232 |
| 7,236,997 B2 | 6/2007 | Nakayama | 708/300 |
| 7,257,264 B2 * | 8/2007 | Nakayama et al. | 382/239 |
| 7,460,729 B2 | 12/2008 | Nakayama | 382/276 |
| 2003/0120691 A1 | 6/2003 | Nakayama | 708/400 |
| 2004/0006581 A1 | 1/2004 | Nakayama | 708/400 |
| 2006/0039626 A1 | 2/2006 | Nakayama | 382/276 |
| 2007/0025632 A1 | 2/2007 | Nakayama | 382/251 |
| 2007/0206868 A1 | 9/2007 | Nakayama | 382/232 |
| 2008/0069464 A1 | 3/2008 | Nakayama | 382/244 |

FOREIGN PATENT DOCUMENTS

JP     2004-038451 A     2/2004

OTHER PUBLICATIONS

Elsayed, H., et al., "A Comparative Study of Lossless Audio Coding Schemes", The 2006 International Conference on Computer Engineering and Systems, University of Alexandria, Egypt, pp. 271-275 (2006).

Nakayama, T., et al., "A Lossless Hadamard Transform Using Independence of Lower Bits of Coefficients", Imaging Visual Computing, Journal of the Institute of Image Electronics Engineers of Japan, pp. 398-404 (2005).

Fukuma, S., et al., "Lossless 8-point Fast Discrete Cosine Transform Using Lossess Hadamard Transform," Shingaku Giho IEICE, DSP99-103, ICD99-190, IE99-65, pp. 37-44 (Oct. 1999).

* cited by examiner

FIG. 5

| STEP | OPERATION |
|---|---|
| 1 | t = D0 ; |
| 2 | D0 += D1 ; |
| 3 | D0 += D2 ; |
| 4 | D0 += D3 ; |
| 5 | D0 += 1 ; |
| 6 | D0 >>= 1 ; |
| 7 | t -= D0 ; |
| 8 | D1 += t ; |
| 9 | D2 += t ; |
| 10 | D3 += t ; |

FIG. 6

| STEP | OPERATION |
|---|---|
| 1 | t = D1 ; |
| 2 | t += D2 ; |
| 3 | t += D3 ; |
| 4 | t += 1 ; |
| 5 | s = t ; |
| 6 | s -= D0 ; |
| 7 | s >>= 1 ; |
| 8 | D0 += t ; |
| 9 | D0 >>= 1 ; |
| 10 | D1 -= s ; |
| 11 | D2 -= s ; |
| 12 | D3 -= s ; |

FIG. 7

| STEP | OPERATION |
|---|---|
| 1 | t = D1 ; |
| 2 | t += D2 ; |
| 3 | D1 += D0 ; |
| 4 | D2 += D0 ; |
| 5 | D3 += D0 ; |
| 6 | t += D3 ; |
| 7 | t += 1 ; |
| 8 | t >>= 1 ; |
| 9 | D0 = t ; |
| 10 | D1 -= t ; |
| 11 | D2 -= t ; |
| 12 | D3 -= t ; |

BACKGROUND ART

FIG. 10

| STEP | OPERATION |
|---|---|
| 1 | X2 += X0 ; |
| 2 | X3 −= X1 ; |
| 3 | t = X3 ; |
| 4 | t += X2 ; |
| 5 | t >>= 1 ; |
| 6 | X0 += t ; |
| 7 | t = X2 ; |
| 8 | t −= X3 ; |
| 9 | t >>= 1 ; |
| 10 | X1 += t ; |
| 11 | X2 −= X1 ; |
| 12 | X3 −= X0 ; |
| 13 | X0 = −X0 ; |

BACKGROUND ART

DATA TRANSFORM APPARATUS AND CONTROL METHOD THEREOF

TECHNICAL FIELD

The present invention relates to a data transform technique for lossless-Hadamard transforming integer data and outputting a transform results.

BACKGROUND ART

An image, particularly a multi-valued image includes many pieces of information, and requires a huge memory size for storage and much time for transmission. For this reason, upon storing or transmitting an image, high-efficiency encoding is used to reduce a data size of the image by processing for removing redundancy of the image or changing the contents of the image to a level at which deterioration of image quality is visually unrecognizable.

For example, JPEG, which is recommended by ISO and ITU-T as an international standard encoding method of a still image, computes discrete cosine transforms (DCTs) for respective blocks (8×8 pixels) of image data, thus obtaining DCT transform coefficients. JPEG compresses the image data by quantizing the DCT transform coefficients and entropy-encoding the quantized transform coefficients. As a compression technique using this DCT, H261, MPEG-1/2/4, and the like are known in addition to JPEG.

As partial processing of this DCT transform or processing for transforming image data, a Hadamard transform is known. The Hadamard transform is an orthogonal transform that uses a transform matrix including elements of only 1 or −1, i.e., a simplest orthogonal transform implemented by only additions and subtractions.

A transform matrix $H_2$ of a 2-point Hadamard transform is defined by:

$$H_2 = \frac{1}{\sqrt{2}} \begin{bmatrix} 1 & 1 \\ 1 & -1 \end{bmatrix} \tag{1}$$

A general N ($=2^n$)-point Hadamard transform matrix $H_N$ can be recursively defined by a Kronecker product between an (N/2)-point Hadamard transform matrix $H_{N/2}$ and the 2-point Hadamard transform matrix $H_2$:

$$H_N = H_{N/2} \otimes H_2 \tag{2}$$

$$= \frac{1}{\sqrt{2}} \begin{bmatrix} H_{N/2} & H_{N/2} \\ H_{N/2} & -H_{N/2} \end{bmatrix}$$

For example, from the above definition, a 4-point Hadamard transform matrix is expressed by:

$$H_4 = \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \tag{3}$$

This transform matrix is called a natural type, and basis vectors are not arranged in a sequency-order. By repeating permutations of basis vectors, the basis vectors in the second row are moved to the fourth row, and those in the original third and fourth rows are moved to rows upper by one row. Then, a transform matrix $WH_4$ in which the order of the basis vectors is a sequency-order is generated:

$$WH_4 = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \tag{4}$$

The above transform matrix is called a Walsh type or Walsh-Hadamard transform matrix. The Hadamard transform is known as a lossless orthogonal transform. Both the natural type and Walsh type allow lossless transforms, and their transform matrices are symmetric matrices.

Another symmetric matrix obtained by permuting the basis vectors of the natural type Hadamard transform matrix $H_4$ is available in addition to the Walsh type. That symmetric matrix is a transform matrix $T_4$ which includes diagonal components of +1 as features and is given by:

$$T_4 = \frac{1}{2} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \tag{5}$$

The present invention will explain examples using the Hadamard transform of this type.

Generally speaking, a Hadamard transform is a reversible transform, as described above. However, this merely means a mathematically reversible transform. That is, the reversible transform is premised on that no calculation errors are generated during transform and inverse transform processes, and fixed- or floating-point calculations are required as a data format for this purpose. Also, all significant digit numbers need to be held after the transform processing.

However, in a Hadamard transform used in transform encoding, particularly lossless transform encoding, the significant digit numbers are to be reduced as much as possible after the transform processing. More specifically, since fractional part data generated by transforming integer input data is considered as a digit number (information) apparently increased from the input data, this fractional part data is to be removed. However, when this fractional part data is simply rounded, reversibility is lost. For example, when four data:

123, 78, 84, 56 undergo Hadamard transform processing using the transform matrix given by equation (5), the transform results are:

170.5, 30.5, 36.5, 8.5

When these values are converted into integers by simply rounding up their fractional parts, we have:

171, 31, 37, 9

It should be noted that the transform matrix given by equation (5) is a transposed matrix. That is, transforming the integer-converted results using equation (5) again is equivalent to inverse transforming, and their inverse transform results are:

124, 78, 84, 56

Upon examining these results, first data "123" becomes "124" via the transform and inverse transform processes. That is, this means that a Hadamard transform that outputs integer-converted data cannot guarantee losslessibility.

In the following description, a Hadamard transform that outputs integer-converted data will be referred to as an integer type Hadamard transform, and an integer type Hadamard transform that allows a reversible transform will be referred to as an integer type lossless-Hadamard transform or lossless-Hadamard transform.

Related arts that implement a lossless 4-point-Hadamard transform can be roughly classified into two techniques. One technique uses a Ladder Network (ladder calculations). The other technique executes round processing of a certain rule after a linear Hadamard transform. The former is disclosed in [Shinji Fukuma, Koichi Oyama, Masahiro Iwahashi, and Noriyoshi Kanbayashi, "Lossless 8-point fast discrete cosine transform using lossless Hadamard transform", IEICE technical report, IE99-65, pp. 37-44, October 1999] (to be referred to as reference 1 hereinafter).

The latter is disclosed in Japanese Patent Laid-Open No. 2003-258645 (to be referred to as reference 2 hereinafter).

In reference 1, the lossless transform is implemented by a complicated sequence of decomposing a 4-point Hadamard transform matrix into triangular matrices, and substituting the triangular matrices by ladder calculations. FIG. 9 shows an example of the arrangement of reference 1. As shown in FIG. 9, the circuit arrangement is complicated, and it is hard to intuitively recognize the contents of calculations. For this reason, mistakes upon software or hardware implementation are hard to be found out, and the calculation processing volume is not so small.

On the other hand, a method disclosed in reference 2 as the latter technique rounds up fractional parts of an odd number of data for transform coefficients of fractional part data obtained by the linear Hadamard transform, and truncates fractional parts of another odd number of data. This reference 2 is characterized by only the method of round processing, but it does not devise to reduce calculations of the linear Hadamard transform and to reduce a processing volume required for the round processing.

DISCLOSURE OF INVENTION

As described above, since the existing lossless 4-point Hadamard transform attaches an importance on losslessibility, it is not suited to fast transform processing due to redundant processing. The present invention improves such points.

The present invention in its first aspect provides a data transform apparatus, which transforms four, integer-represented input data into one DC coefficient and three AC coefficients on a frequency space, which are represented by integers, and outputs the DC coefficient and AC coefficients, the apparatus comprises:

a DC coefficient generating unit which summates the four input data, halves the summation result and converts the halved result into an integer by applying one of two round processes including processing for rounding up a fractional part and processing for truncating a fractional part, and outputs the calculation result as the DC coefficient;

an intermediate data generating unit which generates, as intermediate data, a difference value between one input data of the four input data, and the DC coefficient obtained by the DC coefficient generating unit; and an AC coefficient generating unit which generates three AC coefficients of integers by adding or subtracting the intermediate data generated by the intermediate data generating unit to or from three input data except for the one input data, wherein the DC coefficient generated by the DC coefficient generating unit and the three AC coefficients generated by the AC coefficient generating unit are output as lossless-Hadamard transform coefficients.

The present invention in its second aspect provide provides a data transform apparatus, which transforms four, integer-represented input data into one DC coefficient and three AC coefficients on a frequency space, which are represented by integers, and outputs the DC coefficient and AC coefficients, the apparatus comprises:

a DC coefficient generating unit which generates a DC coefficient which is converted into an integer by applying one of processing for rounding up a fractional part and processing for truncating a fractional part to a value obtained by halving a summation value of all the four input data;

an addition data generating unit which generates three sums of two data out of the four integer input data; and an AC coefficient generating unit which generates three AC coefficients of integers by adding or subtracting the three addition data and the DC coefficient obtained by the DC coefficient generating unit, wherein the DC coefficient generated by the DC coefficient generating unit and the three AC coefficients generated by the AC coefficient generating unit are output as lossless-Hadamard transform coefficients.

The present invention in its third aspect provide provides a data transform apparatus, which transforms four, integer-represented input data into one DC coefficient and three AC coefficients on a frequency space, which are represented by integers, and outputs the DC coefficient and AC coefficients, the apparatus comprises:

a DC coefficient generating unit which generates a DC coefficient which is converted into an integer by applying one of processing for rounding up a fractional part and processing for truncating a fractional part to a value obtained by halving a summation value of all the four input data;

an intermediate data generating unit which generates intermediate data by calculating difference values between one input data of the four input data and other three input data except for the one input data; and an AC coefficient generating unit which generates three AC coefficients of integers by adding or subtracting the intermediate data to or from the other three input data, wherein the DC coefficient generated by the DC coefficient generating unit and the three AC coefficients generated by the AC coefficient generating unit are output as lossless-Hadamard transform coefficients.

The present invention in its fourth aspect provide provides a method of controlling a data transform apparatus, which transforms four, integer-represented input data into one DC coefficient and three AC coefficients on a frequency space, which are represented by integers, and outputs the DC coefficient and AC coefficients, the method comprises:

a DC coefficient generating step of controlling a DC coefficient generating unit to summate the four input data, halve the summation result and convert the halved result into an integer by applying one of two round processes including processing for rounding up a fractional part and processing for truncating a fractional part, and output the calculation result as the DC coefficient;

an intermediate data generating step of controlling an intermediate data generating unit to generate, as intermediate data, a difference value between one input data of the four input data, and the DC coefficient obtained in the DC coefficient generating step; and an AC coefficient generating step of controlling an AC coefficient generating unit to generate three AC coefficients of integers by adding or subtracting the intermediate data generated in the intermediate data generating step to or from three input data except for the one input data, wherein the DC coefficient generated in the DC coefficient generating step and the three AC coefficients generated in the AC coefficient generating step are output as lossless-Hadamard transform coefficients.

The present invention in its fifth aspect provide provides a method of controlling a data transform apparatus, which transforms four, integer-represented input data into one DC coefficient and three AC coefficients on a frequency space, which are represented by integers, and outputs the DC coefficient and AC coefficients, the method comprises:

a DC coefficient generating step of controlling a DC coefficient generating unit to generate a DC coefficient which is converted into an integer by applying one of processing for rounding up a fractional part and processing for truncating a fractional part to a value obtained by halving a summation value of all the four input data;

an addition data generating step of controlling an addition data generating unit to generate three sums of two data out of the four integer input data; and an AC coefficient generating step of controlling an AC coefficient generating unit to generate three AC coefficients of integers by adding or subtracting the three addition data and the DC coefficient obtained in the DC coefficient generating step, wherein the DC coefficient generated in the DC coefficient generating step and the three AC coefficients generated in the AC coefficient generating step are output as lossless-Hadamard transform coefficients.

The present invention in its sixth aspect provide provides a method of controlling a data transform apparatus, which transforms four, integer-represented input data into one DC coefficient and three AC coefficients on a frequency space, which are represented by integers, and outputs the DC coefficient and AC coefficients, the method comprises:

a DC coefficient generating step of controlling a DC coefficient generating unit to generate a DC coefficient which is converted into an integer by applying one of processing for rounding up a fractional part and processing for truncating a fractional part to a value obtained by halving a summation value of all the four input data;

an intermediate data generating step of controlling an intermediate data generating unit to generate intermediate data by calculating difference values between one input data of the four input data and other three input data except for the one input data; and an AC coefficient generating step of controlling an AC coefficient generating unit to generate three AC coefficients of integers by adding or subtracting the intermediate data to or from the other three input data, wherein the DC coefficient generated in the DC coefficient generating step and the three AC coefficients generated in the AC coefficient generating step are output as lossless-Hadamard transform coefficients.

According to the present invention, upon generation of lossless-Hadamard transform coefficients, generation of a DC coefficient and that of AC coefficients are separately executed. A DC coefficient is generated first, and is used in generation of AC coefficients, thus minimizing the number of times of addition/subtraction calculations, and reducing the number of times of round processing required to convert data including a fractional part into an integer. Upon implementation using a computer program, the number of times of copying of register holding data can be reduced under the restriction of a SIMD instruction of a microprocessor. As a result, the total number of processing steps in lossless-Hadamard transform processing and a circuit scale of a lossless-Hadamard transform apparatus can be reduced.

Further features of the present invention will become apparent from the following description of exemplary embodiments with reference to the attached drawings.

BRIEF DESCRIPTION OF DRAWINGS

FIG. 5 is a view showing processing steps when the lossless 4-point Hadamard transform of the first embodiment is implemented by a computer program;

FIG. 6 is a view showing processing steps when the lossless 4-point Hadamard transform of the second embodiment is implemented by a computer program;

FIG. 7 is a view showing processing steps when the lossless 4-point Hadamard transform of the third embodiment is implemented by a computer program;

FIG. 10 is a view showing processing steps of the conventional lossless 4-point Hadamard transform method;

BEST MODE FOR CARRYING OUT THE INVENTION

Preferred embodiments of the present invention will be described in detail hereinafter with reference to the accompanying drawings.

First Embodiment

Figure 1:
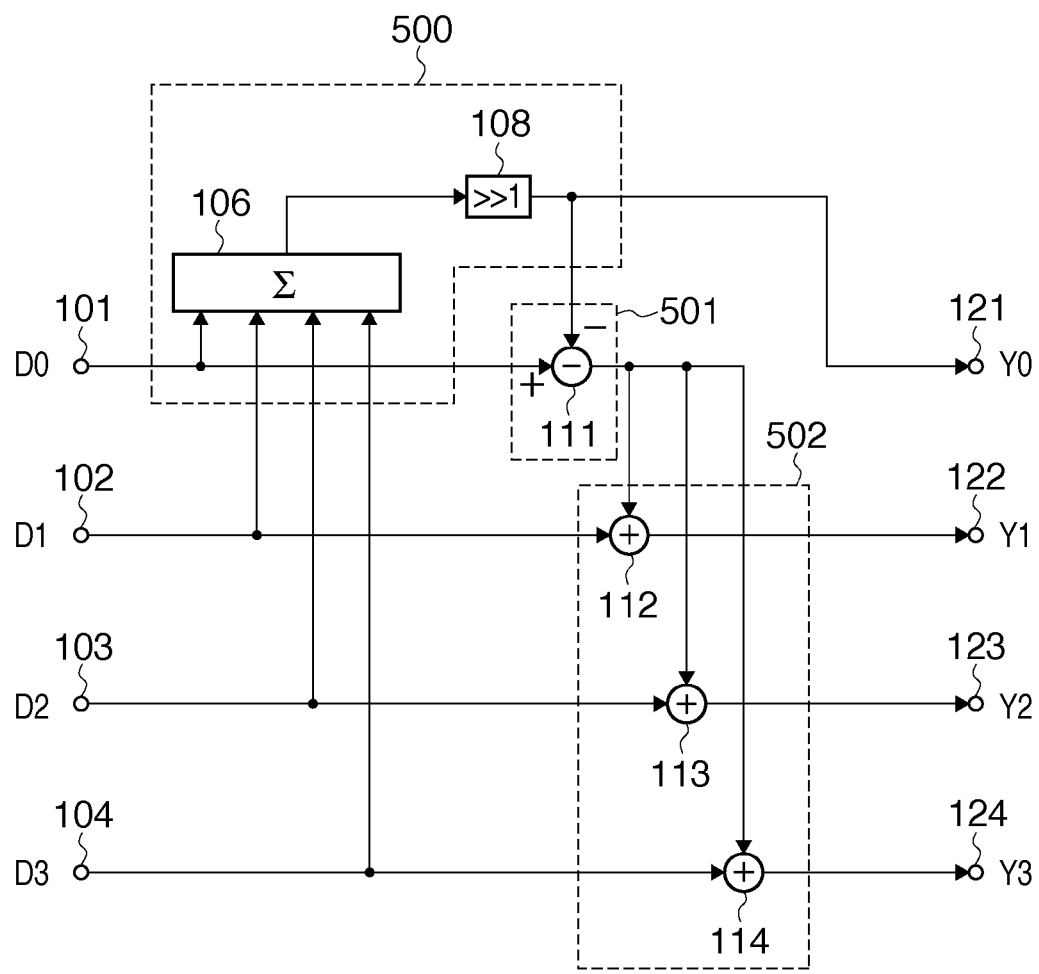
FIG. 1 is a circuit diagram showing the arrangement of a data processing apparatus which implements a lossless 4-point Hadamard transform according to the first embodiment.

FIG. 1 shows the circuit arrangement of a data transform apparatus according to the first embodiment. Referring to FIG. 1, reference numerals 101 to 104 denote terminals for inputting four, integer-represented input data D0, D1, D2, and D3. Reference numeral 106 denotes a 4-input summation unit which summates the four data. Reference numeral 108 denotes a shifter which shifts the summation result (addition result) of the summation unit 106 1 bit to the right. Reference numeral 111 denotes a subtractor which generates intermediate data. Reference numerals 112 to 114 denote adders which respectively add the generated intermediate data to the data D1, D2, and D3 of the input data. Reference numerals 121 to 124 denote terminals which output lossless-Hadamard transform results (integer data Y0, Y1, Y2, and Y3). Note that the subtractor 111 and adders 112 to 114 execute integer calculations.

Although details will be apparent from the following description, a block denoted by reference numeral 500 serves as a DC coefficient generating unit which generates a DC coefficient on a frequency space from the four input data. A block denoted by reference numeral 501 serves as an intermediate data generating unit which calculates a difference between one input data and the DC coefficient, and outputs it as intermediate data. Also, a block denoted by reference numeral 502 serves as an AC coefficient generating unit which generates AC coefficients on the frequency space.

The calculation contents of the arrangement of FIG. 1 will be described below.

The summation unit 106 summates (calculates a total of) all the four data D0, D1, D2, and D3 input from the input terminals 101 to 104, and outputs the total value (=D0+D1+D2+D3) to the shifter 108.

In this embodiment, shifting data X including a plurality of bits m bits to the right (less significant direction) is expressed as "X>>m". The shifter 108 calculates an integer value by shifting the total value calculated by the summation unit 106 1 bit to the right. That is, the shifter 108 calculates "(D0+D1+D2+D3)>>1", and outputs an integer value as the calculation result from the terminal 121 as output data Y0 that represents a lossless DC coefficient.

$$Y0 = (D0 + D1 + D2 + D3) >> 1 \quad (6)$$

It should be noted that the DC coefficient output from the terminal 121 is obtained by truncating its fractional part value. More specifically, a rounding error of a maximum of "−0.5" is superposed on the DC coefficient as the output data Y0.

On the other hand, the subtractor 111 subtracts the value (data Y0) from the shifter 108 from the data D0 input from the input terminal 101, and generates that result as intermediate data. The generated intermediate data is supplied to the first, second, and third adders 112, 113, and 114.

As described above, a rounding error of a maximum of "−0.5" is superposed on the calculated DC coefficient. Since the subtractor 111 subtracts the DC coefficient including this rounding error from the input data D0, a rounding error of a maximum of "+0.5", the sign of which is inverted, is superposed on the intermediate data calculated by the subtractor 111. Round processing that generates such a superposed error is only round-up processing in this case. That is, letting M be a value of the intermediate data calculated by the subtractor 111, that processing yields a value which is equivalent to a round-up processing result, and M assumes a value given by:

$$M = D0 - \{(D0 + D1 + D2 + D3) >> 1\}$$
$$= (D0 - D1 - D2 - D3 + 1) >> 1$$

where "+1" in parentheses indicates that the value M of the intermediate data is rounded-up data.

The first to third adders (reference numerals 112 to 114) respectively add the intermediate data calculated in this way to the input data D1, D2, and D3, and output their addition results from the terminals 122 to 124 as output data Y1, Y2, and Y3 indicating AC coefficients.

Of course, the rounding error of a maximum of "+0.5", which is superposed on the intermediate data, is superposed on the respective data via the first to third adders. That is, a rounding error of a maximum of "+0.5" is superposed on each of the output data Y1, Y2, and Y3 indicating AC coefficients output from the terminals 122 to 124, and these AC coefficients are also equivalent to data that have undergone the round-up processing.

That is, the output data Y1 to Y3 indicating the AC coefficients can be expressed by:

$$Y1 = \{(D0 - D1 - D2 - D3 + 1) >> 1\} + D1 \quad (7)$$
$$= (D0 + D1 - D2 - D3 + 1) >> 1$$

$$Y2 = \{(D0 - D1 - D2 - D3 + 1) >> 1\} + D2$$
$$= (D0 - D1 + D2 - D3 + 1) >> 1$$

$$Y3 = \{(D0 - D1 - D2 - D3 + 1) >> 1\} + D3$$
$$= (D0 - D1 - D2 + D3 + 1) >> 1$$

As can be understood from the above description, the output results of equations (6) and (7) correspond to the lossless-Hadamard transform results using the Hadamard transform matrix $T_4$ given by equation (5) above. That is, in this embodiment, since the number of transform coefficients that have undergone the truncating processing is odd (1), and the number of transform coefficients that have undergone the round-up processing is also odd (3), Hadamard transform coefficients obtained by this arrangement are lossless transform coefficients.

In addition, since only the DC coefficient is generated by round processing different from that for other transform coefficients, an inverse transform can be implemented using identical round processing. That is, the arrangement of FIG. 1 can also implement the inverse transform.

As described above, the data transform apparatus according to the first embodiment serves as a lossless 4-point-Hadamard transform apparatus.

Figure 2A:
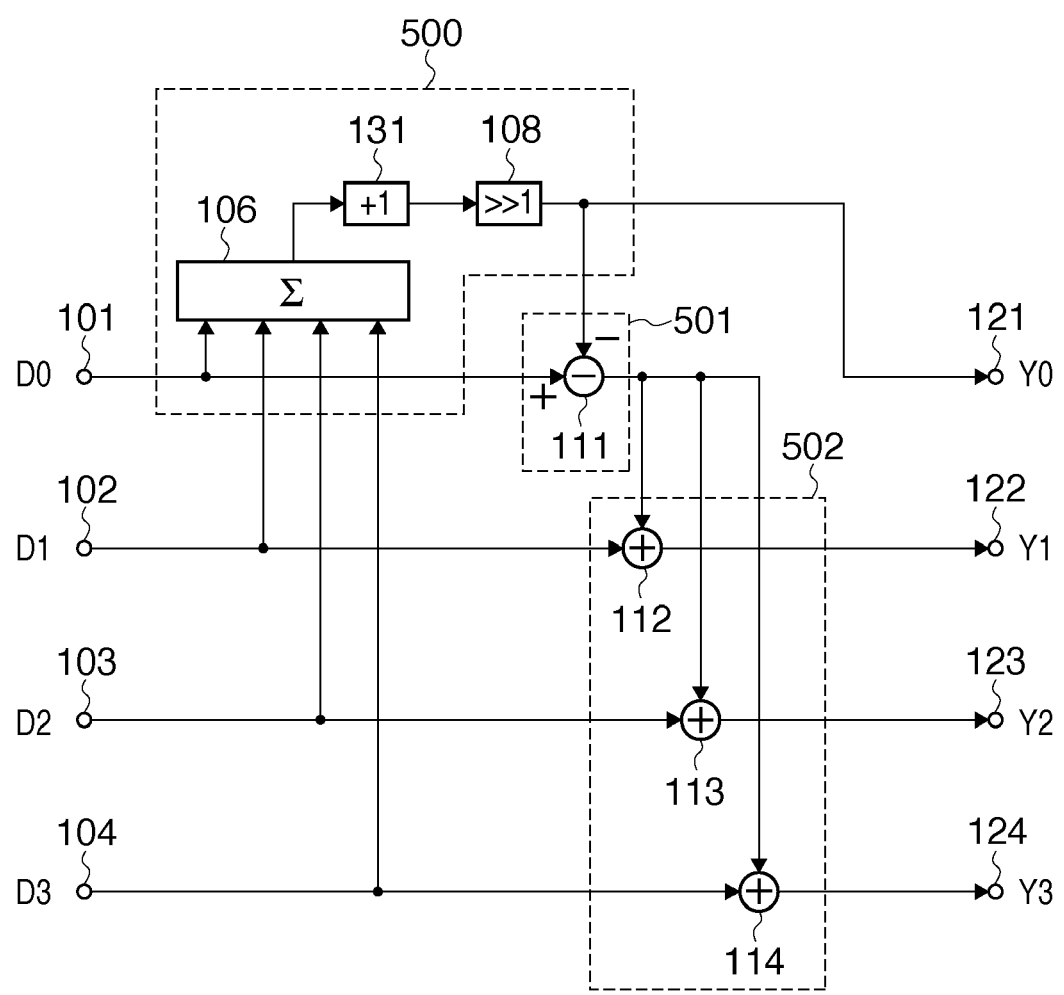
FIG. 2A is a circuit diagram showing the arrangement of a data processing apparatus according to a modification of the first embodiment.

The arrangement shown in FIG. 2A is a modification in which a +1 circuit 131, which adds "1" to the summation result of the summation unit 106, is arranged between the summation unit 106 and shifter 108 in the arrangement of FIG. 1. As a result, the +1 circuit 131 adds "1" to the total value of the input data, and outputs the result to the shifter 108. In this way, the DC coefficient represented by the output data Y0 assumes a value obtained by rounding up a fractional part. Conversely, other three AC coefficients (output data Y1 to Y3) assume values obtained by truncating their fractional parts. As in the case of FIG. 1, Hadamard transform coefficients obtained by the arrangement of FIG. 2A are lossless transform coefficients, and the same arrangement also allows an inverse transform.

Figure 2B:
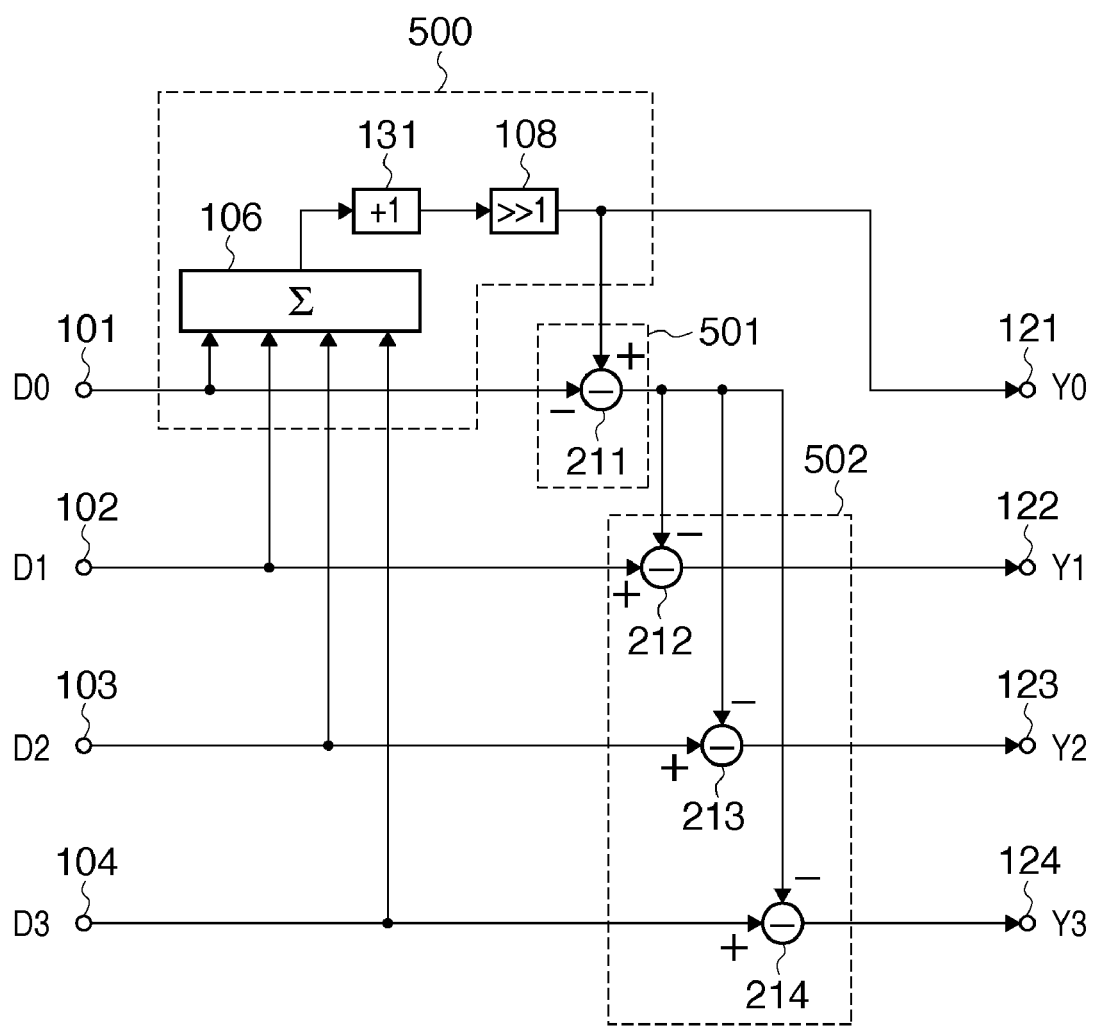
FIG. 2B is a circuit diagram showing the arrangement of a data processing apparatus equivalent to FIG. 2A.

FIG. 2B shows the arrangement equivalent to FIG. 2A. A subtraction input of a subtractor 211 that generates intermediate data in FIG. 2B is different from that of the subtractor 111 in FIG. 2A. That is, the subtractor 211 of FIG. 2B subtracts the input data D0 from the output value from the shifter 108, and outputs that result as intermediate data. Therefore, the sign of the intermediate data as the output of the subtractor 211 in FIG. 2B is opposite to that of the subtractor 111 in FIG. 2A. Hence, subtractors 212 to 214 in FIG. 2B subtract the intermediate data from the input data D1, D2, and D3, respectively, and output these subtraction results as integer AC coefficients, in correspondence with the adders 112 to 114 in FIG. 2A.

Upon executing processing according to the aforementioned lossless-Hadamard transform apparatus using a microprocessor (CPU), fast transform processing can be implemented by embedding a mechanism for parallelly processing data from a plurality of blocks.

Such mechanism can be implemented by an SIMD (Single Instruction stream Multiple Data stream) type instruction required to divide a 64- or 128-bit internal register of the microprocessor into 4 or 8, and to parallelly process 8- or 16-bit data. The SIMD type instruction itself is normally embedded in recent CPUs.

This SIMD type instruction generally has a 2-operand format, and a calculation result between a source register and destination register is stored in the destination register.

Upon evaluating software processing corresponding to the arrangement of FIG. 2A under that condition, the software processing requires a sequence shown in FIG. 5. In FIG. 5, the left column indicates steps, and the right column indicates operations. As shown in FIG. 5, the series of processes can be implemented by 10 steps. In order to reduce substitution statements, input data D0 is copied to register t (step 1), and a DC coefficient is calculated on the register that stores the input data D0. The intermediate data is generated on register t. Note that in FIG. 5, D0+=D1 represents D0→D0+D1, and indicates that the register that holds D0 is updated by the addition result of D0 and D1. Likewise, "D0>>=1" indicates 1-bit right shift processing of the register that holds D0 (0 is stored in a most significant bit).

As can be understood from the above description, the data transform apparatus according to the first embodiment serves as a lossless 4-point Hadamard transform apparatus.

Figure 9:
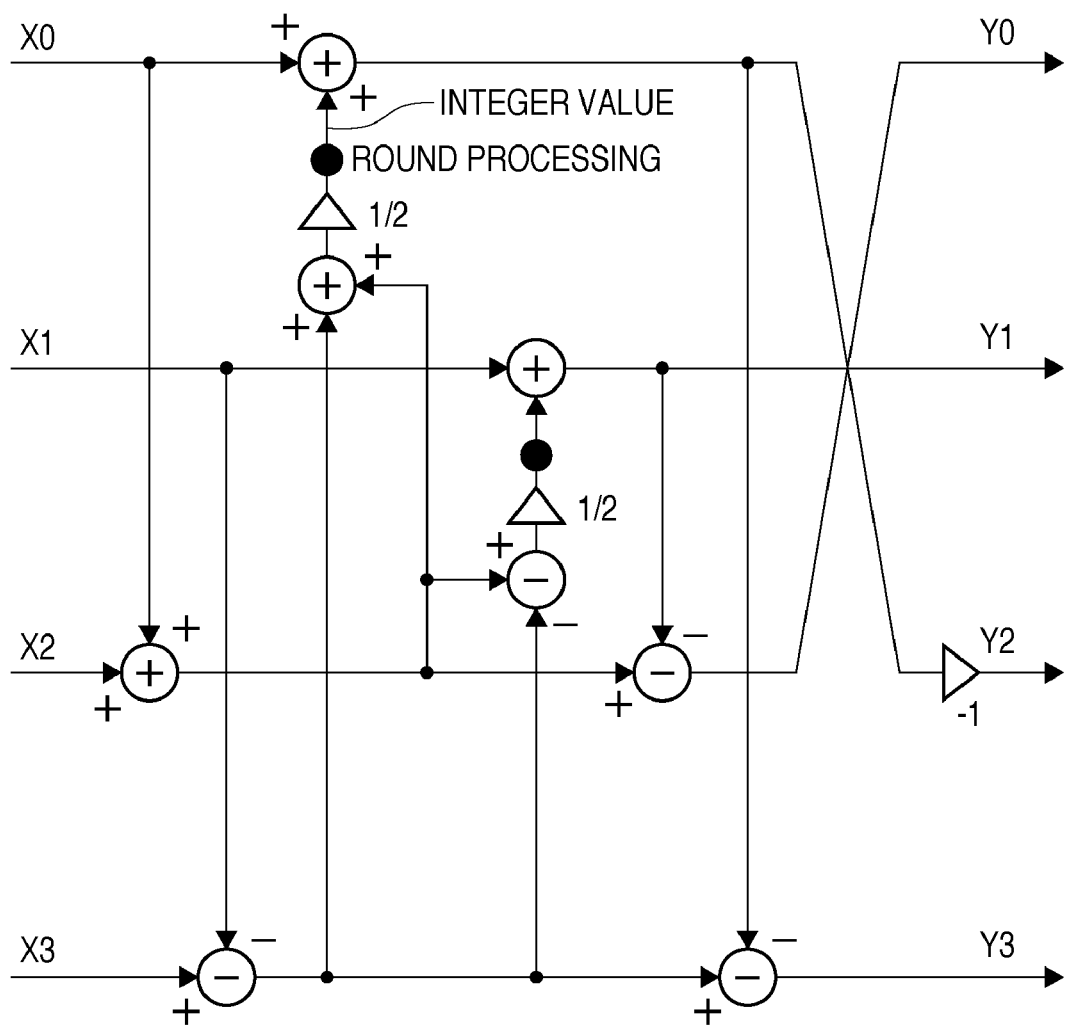
FIG. 9 is a circuit diagram showing the arrangement of a conventional lossless 4-point Hadamard transform apparatus.

By comparison, FIG. 10 shows the processing sequence of software processing corresponding to the arrangement of FIG. 9. As shown in FIG. 10, the series of processes require at least 13 steps, and some transform data need to be substituted. These 13 steps do not include any substitution.

The related art requires applying round processing to two or four data. By contrast, this embodiment need only apply round processing to one data, the number of addition/subtraction times of data is as small as 7, and the number of times of data copy is only 1. That is, the processing sequence shown in FIG. 5 can implement the lossless-Hadamard transform processing by fewer numbers of times than FIG. 9 in all items of the round processing, addition/subtraction processing, and copy processing.

In the first embodiment, for example, the arrangement of FIG. 1 implements ½ processing for truncating a fractional part of the summation result by the 1-bit right shift processing of the shifter 108. For example, in place of the shifter 108, a ½ calculation unit which holds fractional part data, and a rounding unit which rounds up a fractional part of a result of this ½ calculation unit may be arranged. In this case, the ½ calculation unit calculates ½ of the summation result from the summation unit 106, and outputs a value including a fractional part to the rounding unit. The rounding unit adds "0.5" to the value from the ½ calculation unit, converts that sum into an integer by truncating the fractional part of that sum, and outputs the result to the subtractor 111.

Second Embodiment

Figure 3:
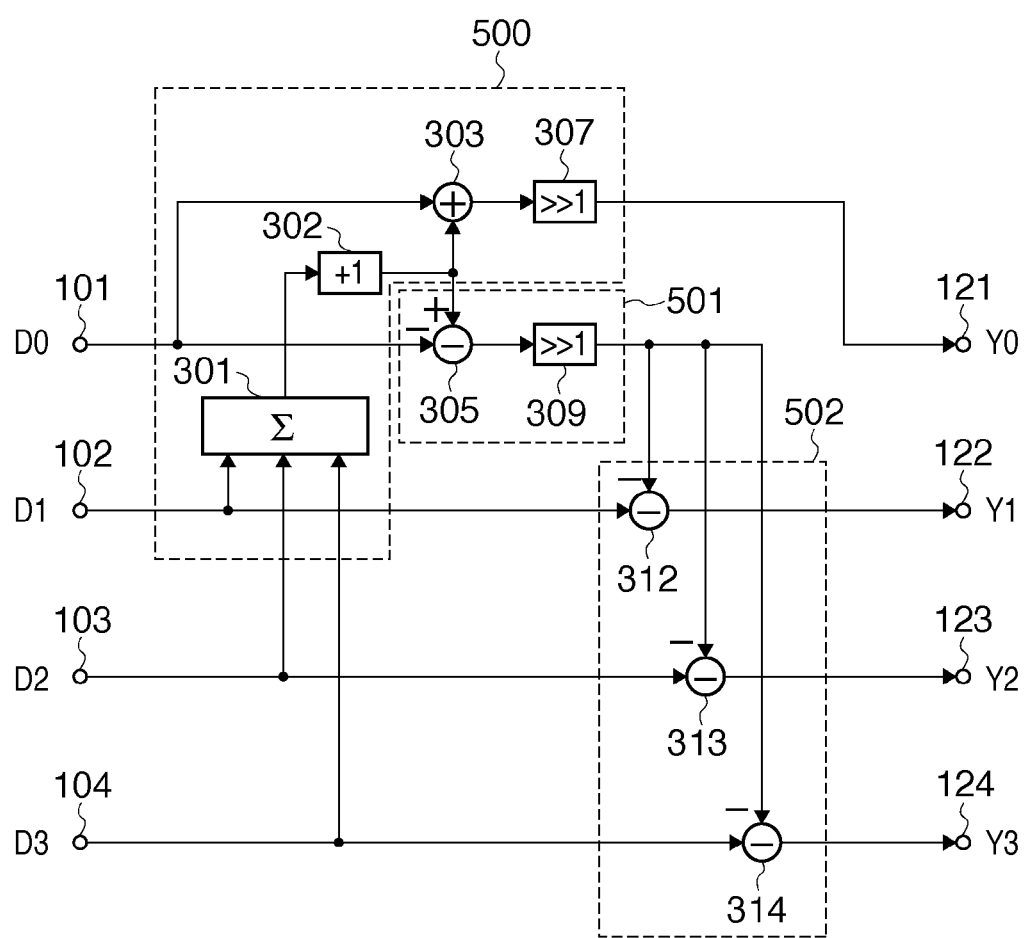
FIG. 3 is a circuit diagram showing the arrangement of a data processing apparatus according to the second embodiment.

FIG. 3 shows the circuit arrangement of a data transform apparatus according to the second embodiment. The arrangement of FIG. 3 has a point in that a delay time upon processing using hardware can be reduced. Referring to FIG. 3, reference numeral 301 denotes a 3-input summation unit which summates three data D1, D2, and D3 of four input data; and 302, a +1 adder which adds "1" required to round-up a fractional part in the subsequent stage (round processing). Reference numeral 303 denotes an adder which adds input data D0 to the summation result from the +1 adder 302. Reference numeral 305 denotes a first subtractor which subtracts the input data D0 from the summation result from the +1 adder 302. Reference numeral 307 denotes a first shifter which shifts the output value from the adder 303 1 bit to the right to generate output data Y0 that represents a DC coefficient. Reference numeral 309 denotes a second shifter which shifts the output value from the subtractor 305 1 bit to the right to generate the bit shift result as intermediate data. Reference numerals 312 to 314 respectively denote second, third, and fourth subtractors which subtract the intermediate data generated by the second shifter 309 from the three input data D1, D2, and D3. Data input and output terminals are the same as those in the arrangement of FIG. 2A.

In the arrangement of FIG. 2A, the number of stages of calculations required from the data input until output data Y1, Y2, and Y3 are obtained is four (output data Y0 requires three stages). The first stage includes a calculation in the summation unit 106, the second stage includes that in the +1 adder 131, the third stage includes that in the subtractor 111, and the fourth stage includes those in the adders 112 to 114.

In case of hardware implementation of the 1-bit right shift processing, a time required for calculation can be basically ignored since it can be attained by simply shifting a data signal line by 1 bit (1 line).

In the arrangement of FIG. 3 as well, the number of stages of calculations from the input terminals until output data Y1, Y2, and Y3 are obtained is four as in FIG. 2A. However, since the number of inputs of the summation unit used in the calculation of the first stage is decreased from 4 to 3, a gate delay time due to calculations can be reduced accordingly.

On the other hand, upon implementation of processing equivalent to FIG. 3 by software processing, it can be processed in 12 steps since one bit shift calculation and one data copy operation are added, as shown in a list of FIG. 6.

Modification of Second Embodiment

Figure 8:
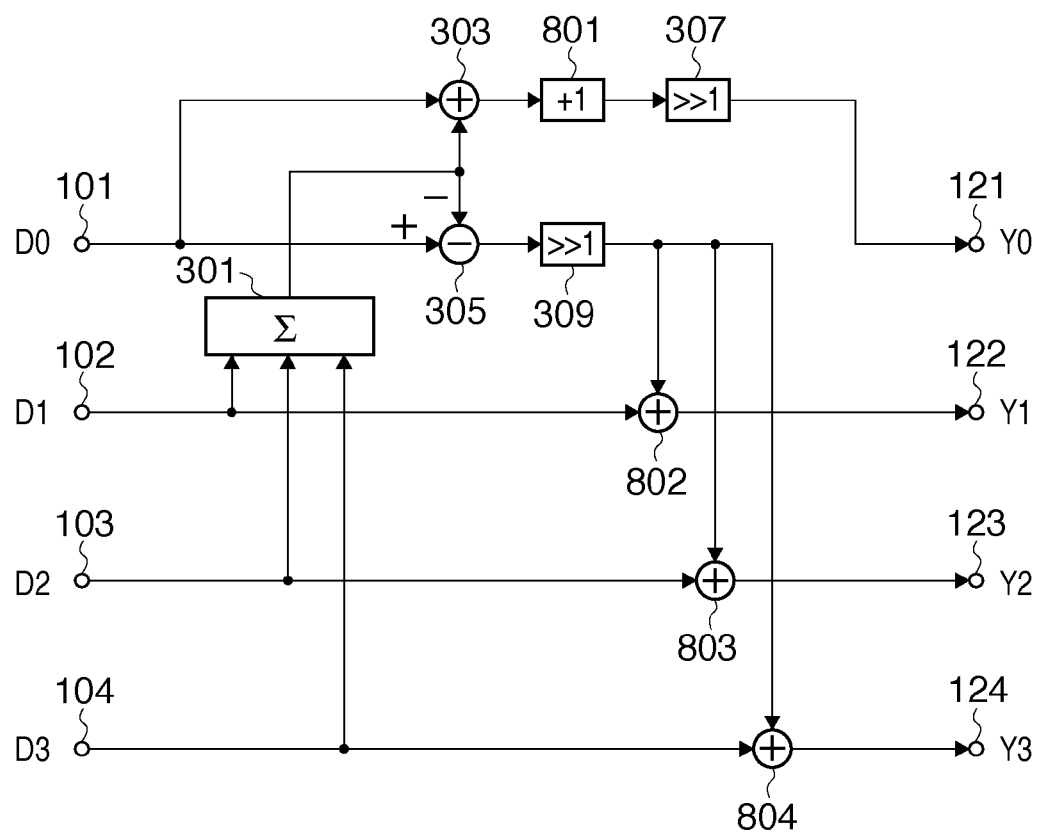
FIG. 8 is a circuit diagram showing the arrangement of a data processing apparatus according to a modification of the second embodiment.

The arrangement of FIG. 3 may be modified to that of FIG. 8. The large differences between FIGS. 8 and 3 are that all of the second to fourth subtractors (reference numerals 312 to 314) in FIG. 3 are replaced by adders 802 to 804, and the following changes (1) and (2) are made.

(1) The subtractor 305 in FIG. 3 subtracts the input data D0 from the output value from the +1 adder 302. However, the subtractor 305 in FIG. 8 subtracts the output value of the summation unit 301 from the input data D0. That is, the sign of the output value of the subtractor 305 in FIG. 8 is inverted from that of the output value of the subtractor 305 in FIG. 3.

(2) In order to execute different round processes to generate a DC coefficient and AC coefficients, if one coefficient is generated by truncating processing, the other is generated by round-up processing. For this purpose, in the arrangement of FIG. 8, a DC coefficient is generated by round-up processing, and AC coefficients are generated by truncating processing. That is, a +1 adder 801 is arranged between the adder 303 and first shifter 307.

By adding the changes (1) and (2), output data Y0 to Y3 become lossless-Hadamard transform coefficients.

Third Embodiment

Figure 4:
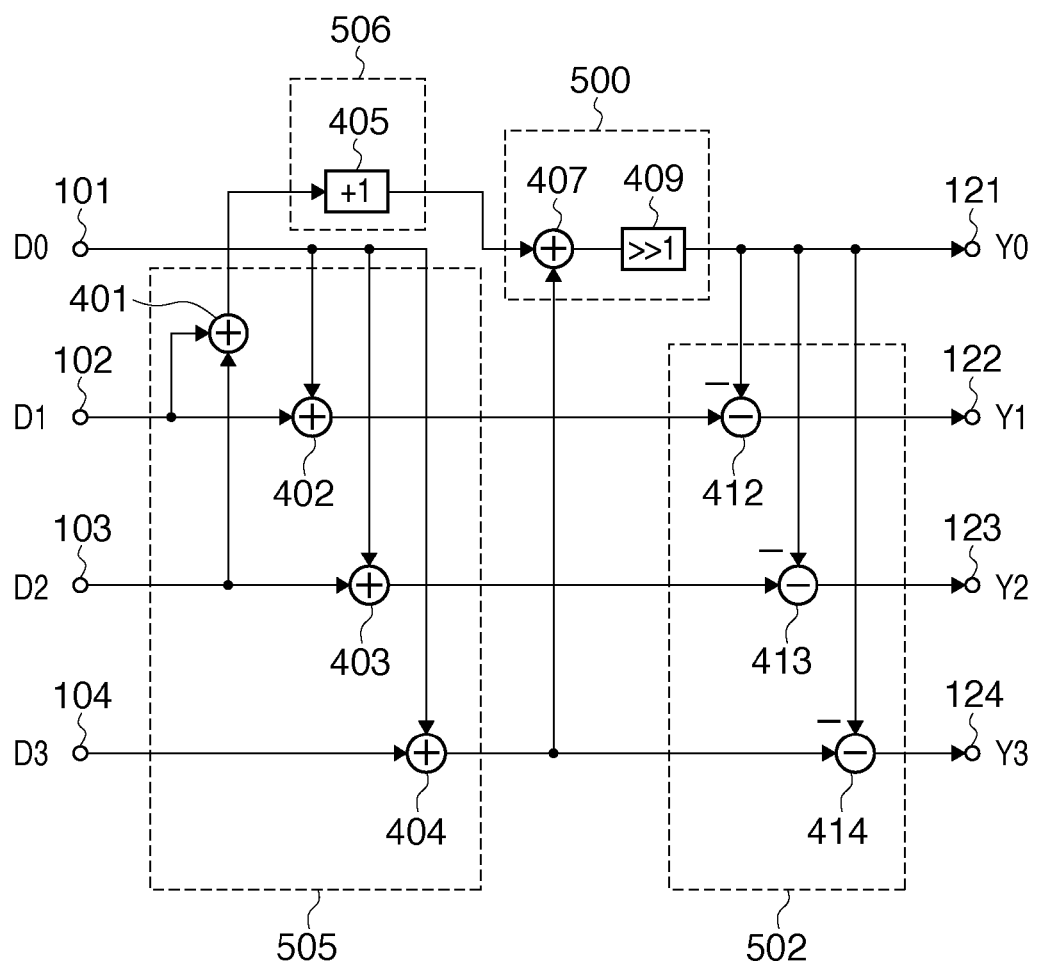
FIG. 4 is a circuit diagram showing the arrangement of a data processing apparatus according to the third embodiment.

FIG. 4 shows the circuit arrangement of a data transform apparatus according to the third embodiment. Referring to FIG. 4, reference numeral 401 denotes a first adder which adds two data D1 and D2 of four input data; and 402 to 404, second to fourth adders which add input data D0 to respective input data D1, D2, and D3. That is, these adders 402 to 404 serve as an addition data generating unit which generates three sums of two data out of four integer input data.

Reference numeral 405 denotes a +1 adder which adds "1" to the output value of the first adder 401. Reference numeral 407 denotes a fifth adder which adds the output value from the fourth adder 404 to the addition result of the +1 adder 405. Reference numeral 409 denotes a shifter which shifts the addition result of the adder 407 1 bit to the right. Reference numerals 412 to 414 denote first to third subtractors which respectively subtract the output value from the shifter 409 from the output values of the second to fourth adders 402 to 404. Data input and output terminals are the same as those in the arrangement of FIG. 1.

In the arrangement of FIG. 4 as well, the number of stages of calculations required from the input terminals until output data Y1, Y2, and Y3 are obtained is four. That is, the first stage includes calculations by the first to fourth adders 401 to 404, the second stage includes that by the +1 adder 405, the third stage includes that by the fifth adder 407, and the fourth stage includes those by the first to third subtractors 412 to 414. Since each of the first to fourth adders that make calculations in the first stage requires only two inputs, a delay time can be further reduced.

Therefore, the first to fourth adders 401 to 404 in the first stage serve as a first addition processing unit 505, and the +1 adder 405 in the second stage serves as a second addition processing unit 506. The adder 407 and shifter 409 in the third stage serve as a DC coefficient generating unit 500, and the subtractors 412 to 414 in the fourth stage serve as an AC coefficient generating unit 502.

Software processing can be processed in 12 steps, as shown in a list of FIG. 7. Since one addition/subtraction operation is increased but one bit shift calculation is decreased with respect to the list of FIG. 6 as the second embodiment, the software processing can be processed in 12 steps which are the same as those in FIG. 6.

Fourth Embodiment

Figure 11:
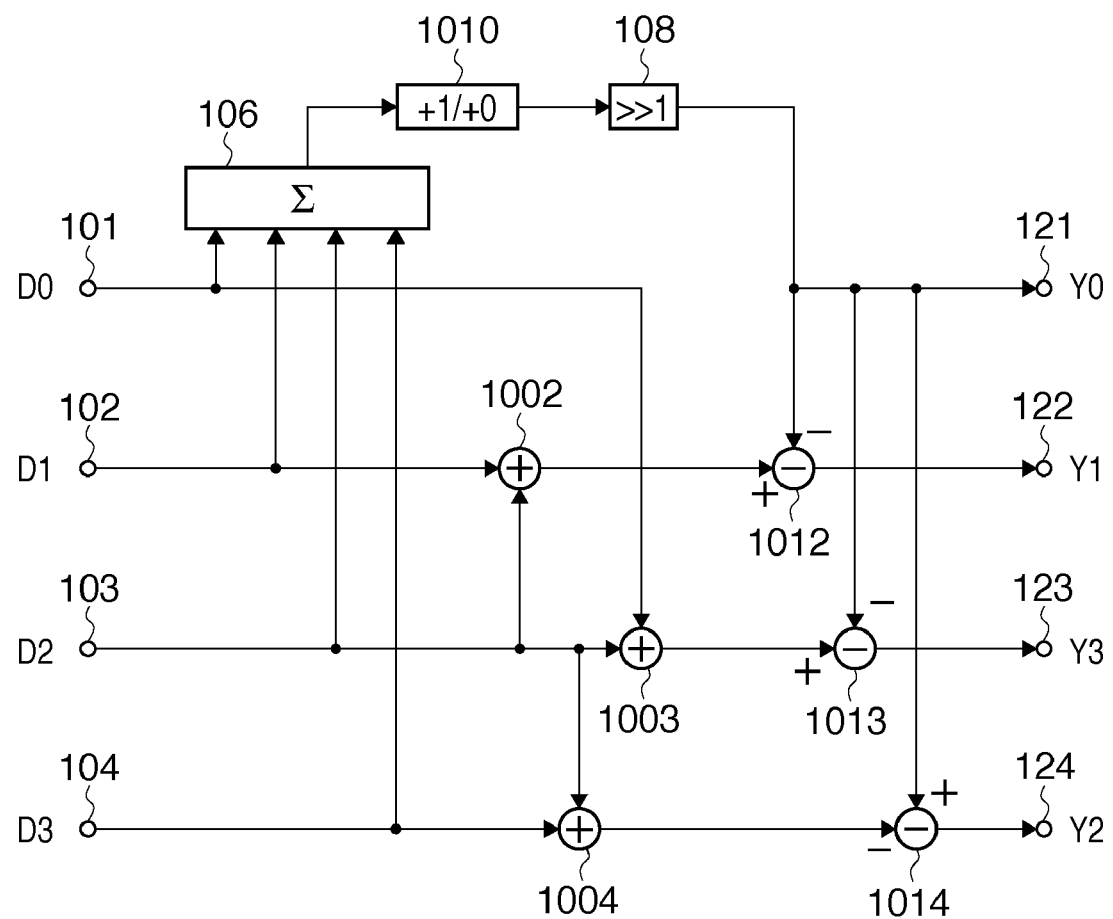
FIG. 11 is a circuit diagram showing the arrangement of a data processing apparatus according to the fourth embodiment.

FIG. 11 shows the circuit arrangement of a data transform apparatus according to the fourth embodiment. Referring to FIG. 11, reference numerals 1002 to 1004 denote adders, each of which calculates a sum of two input data. The adder 1002 adds first input data D0 to second input data D1, and outputs that result as first intermediate data. The adder 1003 adds the second input data D1 to third input data D2, and outputs that result as second intermediate data. The adder 1004 adds the second input data D1 to fourth input data D3, and outputs that result as third intermediate data. That is, these adders 1002 to 1004 serve as an addition data generating unit which generates three sums of two data out of four integer input data.

Reference numerals 1012 to 1014 denote subtractors which make subtractions between the outputs (first to third intermediate data) of the adders 1002 to 1004 and an integer-converted DC coefficient. Reference numeral 1010 denotes a +1 adder which adds "1" or "0" in accordance with an external control signal. Since other components are the same as those in FIG. 1, and the same reference numerals denote them, a repetitive description thereof will be omitted. Note that the subtractor 1012 subtracts a value from a shifter 108 from the first intermediate data from the adder 1002, and outputs that result as a first AC coefficient. By contrast, it should be noted that the subtractors 1013 and 1014 subtract the second and third intermediate data from the adders 1003 and 1004 from the value from the shifter 108, and output these results as second and third AC coefficients. In this manner, the first to third AC coefficients are obtained.

A feature of the fourth embodiment lies in that two AC coefficients (data Y2 and Y3) out of three AC coefficients are generated by subtracting the sums of two data from the integer-converted DC coefficient (the output value from the shifter 108).

In this way, only data Y1 indicating one of the three AC coefficients, i.e., the AC coefficient output from the terminal 122, has the contents of round processing different from other three transform coefficients.

That is, when the +1 adder 1010 adds "1" to the value from a summation unit 106, the output data Y0, Y2, and Y3 are obtained as a result of the round processing by rounding up their fractional parts, and only the AC coefficient represented by the output data Y1 from the output terminal 122 is obtained as a result of the round processing by truncating its fractional part.

On the other hand, when the value to be added by the +adder 1010 is changed to "0", only the AC coefficient represented by the output data Y1 from the output terminal 122 is obtained as a result of the round processing by rounding up its fractional part, and other three transform coefficients are obtained as a result of truncating processing of their fractional parts.

In either case, since round-up processing is applied to the odd number of data, and truncating processing is applied to the remaining odd number of data, the transform results become lossless transform coefficients having losslessibility.

Upon execution of the lossless transform by adding "1" by the +1 adder 1010, that adder adds "0" in case of an inverse transform to reconstruct original data perfectly. Conversely, upon execution of the lossless transform by adding "0" by the adder 1010, that adder adds "1" in case of an inverse transform to reconstruct original data perfectly.

Modification of Fourth Embodiment

Figure 12:
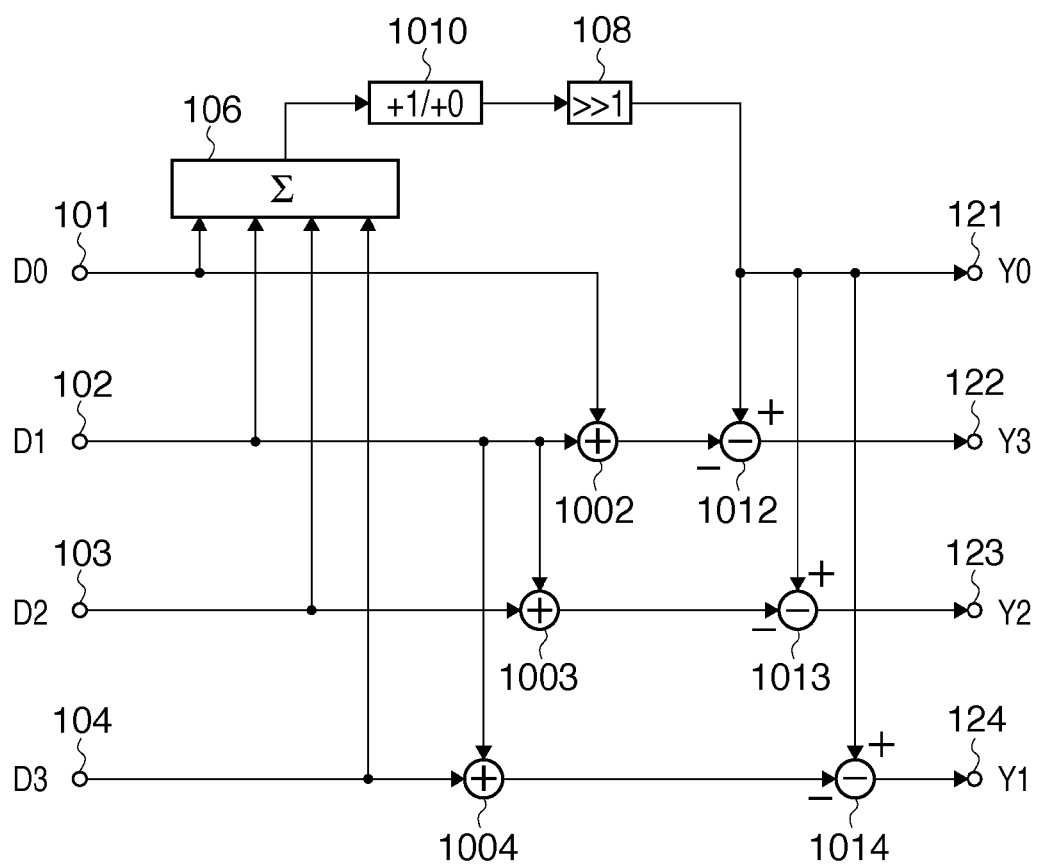
FIG. 12 is a circuit diagram showing the arrangement of a data processing apparatus according to a modification the fourth embodiment.
Figure 13:
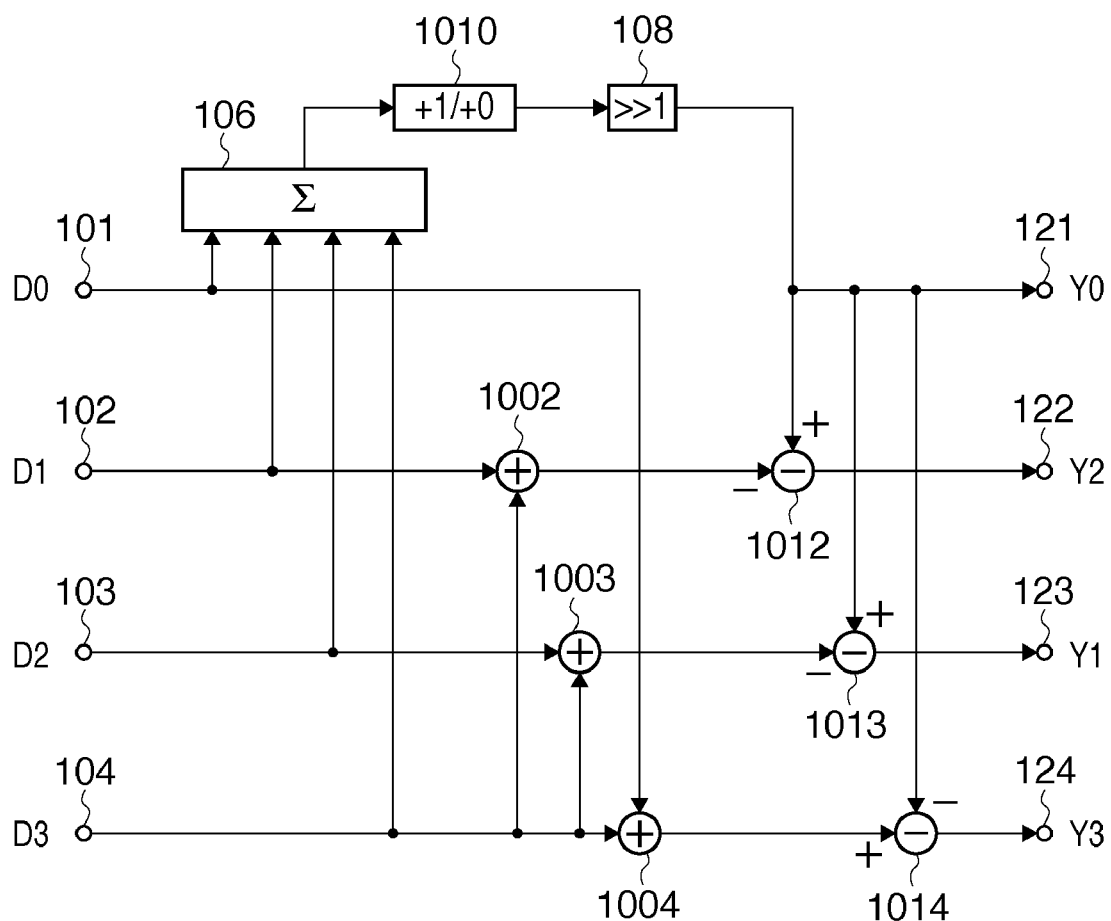
FIG. 13 is a circuit diagram showing the arrangement of a data processing apparatus according to another modification of the fourth embodiment.

FIGS. 12 and 13 show modifications of the fourth embodiment. Since components are basically the same as those in FIG. 11, three adders 1002 to 1004 each having one different input source are denoted by the same reference numerals as in FIG. 11.

The differences among FIGS. 12, 13, and 11 are that only one AC coefficient obtained by different round processing is different.

In FIG. 11, one AC coefficient obtained by different round processing is that to be output from the terminal 122, while it corresponds to an AC coefficient to be output from the output terminal 123 in FIG. 12 and that to be output from the output terminal 124 in FIG. 13.

In each of FIGS. 12 and 13, upon execution of the lossless transform by adding "1" by the +1 adder 1010, that adder adds "0" in case of an inverse transform to perfectly reclaim original data. Conversely, upon execution of the lossless transform by adding "0" by the adder 1010, that adder adds "1" in case of an inverse transform to perfectly reclaim original data.

As can be easily understood from FIGS. 12 and 13, the arrangements of FIGS. 12 and 13 are modifications attained by merely replacing inputs in FIG. 11. That is, when a sequence of four input data in FIG. 11 in an order from top to down is expressed by {D0, D1, D2, D3}, that in FIG. 12 corresponds to a case in which data are input in an order of {D0, D2, D1, D3} or {D0, D2, D3, D1}. Also, the sequence in the arrangement of FIG. 13 corresponds to a case in which data are input in an order of {D0, D3, D1, D2} or {D0, D3, D2, D1}.

Note that the losslessibility of various lossless-Hadamard transform apparatuses described in the embodiments is on the ground of identity with the round processing in reference 2 presented previously. In one arrangement of a transform/inverse transform apparatus based on this embodiment, the losslessibility of transforms can be relatively easily demonstrated.

Figure 14:
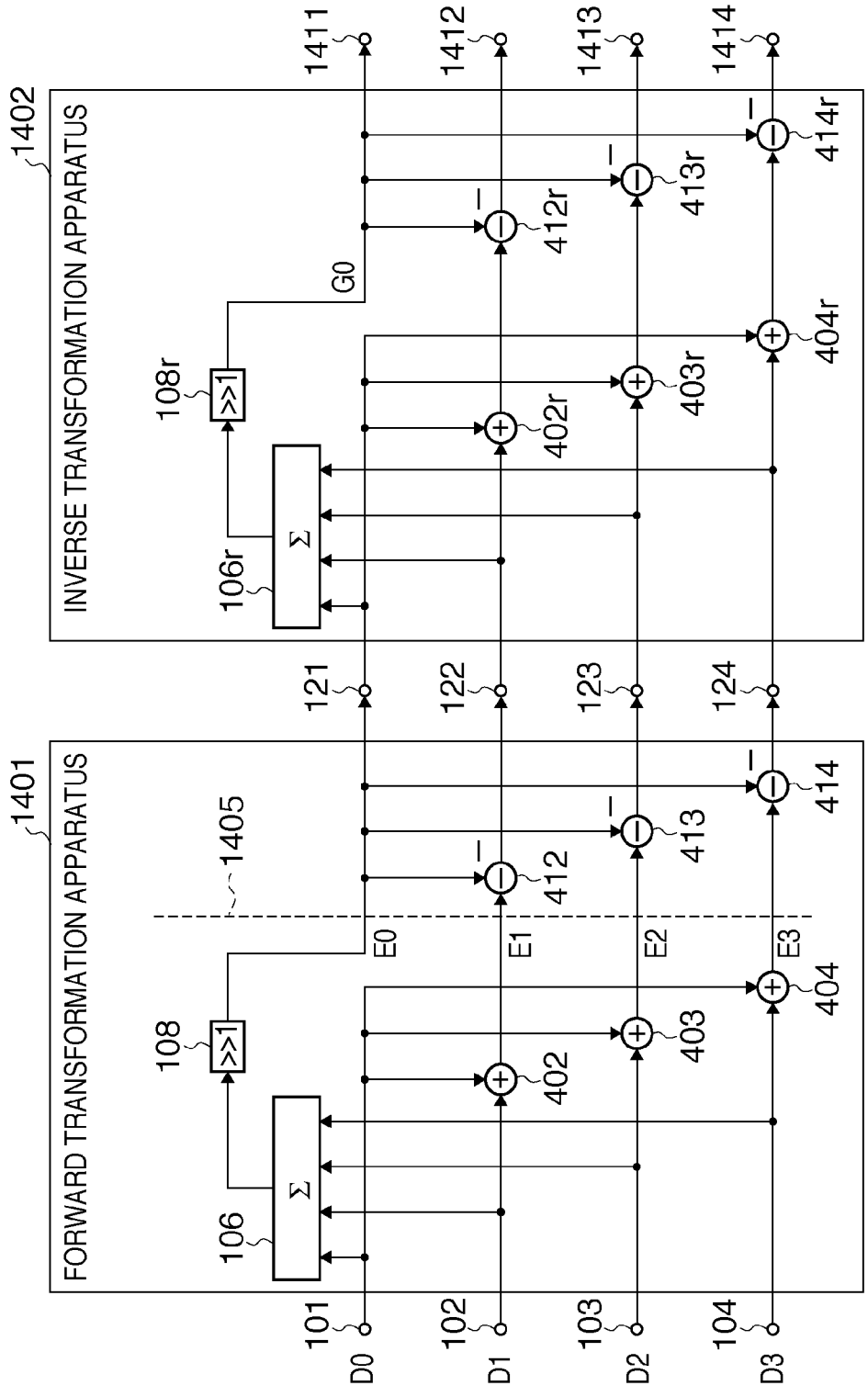
FIG. 14 is a circuit diagram for explaining the losslessibility of the transform apparatus described in each embodiment.

FIG. 14 shows that arrangement, and the losslessibility of transforms will be briefly explained. For the sake of simplicity, a forward transform apparatus 1401 and an inverse transform apparatus 1402, which have the same arrangement, are cascaded in FIG. 14. In order to distinguish components in these transform apparatuses, letter "r" is appended after each of reference numerals of components on the inverse transform apparatus side.

The losslessibility of transforms will be demonstrated by proving that output data outputted from four output terminals 1411 to 1414 of the inverse transform apparatus 1402 in FIG. 14 become the same as data D0, D1, D2, and D3 input to the four input terminals 101 to 104 of the forward transform apparatus 1401.

The arrangement of the forward transform apparatus 1401 and inverse transform apparatus 1402 allows the following two interpretations.

The first interpretation is an arrangement in which the +1 circuit is removed from the arrangement shown in FIG. 4, and the two adders 401 and 407 used to calculate a DC coefficient are combined into one adder 106.

The second interpretation is an arrangement in which calculations for respectively adding a result obtained by subtracting a DC coefficient from input data D0 to three input data D1, D2, and D3 in the arrangement shown in FIG. 1 are replaced by calculations for subtracting a DC coefficient from the three input data after addition of the input data D0.

In order to prove that the four output data of the inverse transform apparatus 1402 become the same as the four input data D0, D1, D2, and D3 to the forward transform apparatus 1401, attention is focused on internal data E0, E1, E2, and E3 on a broken line 1405 in the forward transform apparatus 1401.

In the forward transform apparatus 1401, E0 is subtracted from each of data E1, E2, and E3. This E0 is added to the above subtraction results by adders 402r to 404r in the inverse transform apparatus 1402. For this reason, as can be easily understood from the above description, the outputs from the three adders 402r, 403r, and 404r in the inverse transform apparatus 1402 respectively return to E1, E2, and E3.

The internal data E0, E1, E2, and E3 are the results obtained by adding another input data D0 to three input data D1, D2, and D3 to the forward transform apparatus 1401. Hence, when D0 can be subtracted from E1, E2, and E3 as the output data of the adders 402r to 404r in the inverse transform apparatus 1402, they can return to D1, D2, and D3, which can be output as inverse transform results.

Therefore, if it can be proved that data G0 to be commonly subtracted by three subtractors 412r, 413r, and 414r in the inverse transform apparatus 1402 is D0, the losslessibility of the data D1, D2, and D3 can be demonstrated.

Primarily, since the data G0 is data to be output as D0 from the terminal 1411, it can be easily supposed that the data G0 equals D0 by strictly tracing the processing steps of the forward and inverse transform apparatuses. Of course, G0=D0 will be strictly demonstrated.

In the following description, F0 as internal data before bit shift of G0 is expressed by the sum of input data of the inverse transform apparatus, that equation is modified to re-express F0 using only input data D0, D1, D2, and D3, and after that, G0=D0 will be demonstrated.

$$F0 = E0 + (E1 - E0) + (E2 - E0) + (E3 - E0)$$
$$= E1 + E2 + E3 - 2*E0$$
$$= (D1 + D0) + (D2 + D0) + (D3 + D0) - 2*E0$$
$$= 3*D0 + D1 + D2 + D3 - 2*E0$$
$$= 3*D0 + D1 + D2 + D3 - 2*((D0 + D1 + D2 + D3) >> 1)$$

When a value is shifted 1 bit to the right and that result is doubled, if the value before shift is an odd value, "1" is subtracted from the original value, or if it is an even value, the original value is left unchanged. Hence, "1" is subtracted from or "0" is added to the values in the parentheses. If this is expressed by "−0.5±0.5", F0 is expressed by:

$$F0 = 3*D0 + D1 + D2 + D3 - (D0 + D1 + D2 + D3 - 0.5 \pm 0.5)$$
$$= 2*D0 + 0.5 \pm 0.5$$

Use of this result can demonstrate G0=D0, as given by:

$$G0 = F0 >> 1$$
$$= (2*D0 + 0.5 \pm 0.5) >> 1$$

"0.5±0.5" in the parentheses represents an LSB (least significant bit) of an integer, and is truncated by 1-bit right shift processing. Hence, we have:

G0=D0

That is, the losslessibility of the forward transform apparatus 1401 and inverse transform apparatus 1402 can be demonstrated.

As described in reference 1 presented previously, the lossless DCT transform can be efficiently implemented using the lossless-Hadamard transform. The lossless DCT transform can be implemented more efficiently using the lossless-Hadamard transform according to this embodiment.

When the lossless DCT transform coefficients are quantized and entropy-encoded, encoding compatible to JPEG can be implemented. When those transform coefficients are encoded without quantization, lossless encoding can be implemented.

When transform coefficients are encoded without quantization, if they undergo a lossless inverse transform upon decoding, original image data can be perfectly reclaimed. When encoded transform coefficients undergo general DCT inverse transform processing in place of lossless inverse transform processing, image data close to original data can be reclaimed.

In the present invention, an integer is consistently used as each input data. However, fixed-floating point data may be obviously used as the input data. That is, when input data having n bits as a fractional part undergoes lossless transform processing based on the present invention, a lossless transform coefficient also becomes data having n bits as a fractional part.

The position of the decimal point is a problem of data interpretation, and is not particularly limited as long as the decimal point is similarly moved between input and output data.

As can be seen from the description of the above embodiments, since processing equivalent to the apparatus in each embodiment can be implemented by a computer program, the scope of the present invention includes such a computer program, of course. Normally, a computer program is stored in a computer-readable storage medium such as a CD-ROM or the like. The storage medium is set in a computer reading device (CD-ROM drive) to copy or install the program in a system, thus allowing the program to be executed. Therefore, it is obvious that the scope of the present invention includes the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-280941, filed Oct. 29, 2007, and 2008-226378, filed Sep. 3, 2008, which are hereby incorporated by reference herein in their entirety.

The invention claimed is:

1. A data transform apparatus, which transforms four integer-represented input data into one DC coefficient and three AC coefficients on a frequency space, which are represented by integers, and outputs the DC coefficient and AC coefficients, the apparatus comprising:
   a DC coefficient generating unit which summates the four input data, halves the summation result and converts the halved result into an integer by applying one of two round processes including processing for rounding up a fractional part and processing for truncating a fractional part, and outputs the calculation result as the DC coefficient;
   an intermediate data generating unit which generates, as intermediate data, a difference value between one input data of the four input data, and the DC coefficient obtained by said DC coefficient generating unit; and
   an AC coefficient generating unit which generates three AC coefficients of integer by adding or subtracting the intermediate data generated by said intermediate data generating unit to or from three input data except for the one input data,
   wherein the DC coefficient generated by said DC coefficient generating unit and the three AC coefficients generated by said AC coefficient generating unit are output as lossless-Hadamard transform coefficients.

2. The apparatus according to claim 1, wherein said intermediate data generating unit generates, as the intermediate data, a value obtained by subtracting the DC coefficient obtained by said DC coefficient generating unit from one input data of the four input data, and
   said AC coefficient generating unit outputs, as the AC coefficients, three addition results obtained by adding the intermediate data to three input data except for the one input data.

3. The apparatus according to claim 1, wherein said intermediate data generating unit generates, as the intermediate data, a value obtained by subtracting one input data of the four input data from the DC coefficient obtained by said DC coefficient generating unit, and
   said AC coefficient generating unit outputs, as the AC coefficients, three subtraction results obtained by subtracting the intermediate data from three input data except for the one input data.

4. A non-transitory computer-readable storage medium which stores a computer program, said computer program being read in by a computer to thereby cause the computer to function as a data transform apparatus set forth in claim 1.

5. A method of controlling a data transform apparatus, which transforms four integer-represented input data into one DC coefficient and three AC coefficients on a frequency space, which are represented by integers, and outputs the DC coefficient and AC coefficients, the method comprising:
   a DC coefficient generating step in which a DC coefficient generating unit summates the four input data, halves the summation result, converts the halved result into an integer by applying one of two round processes including processing for rounding up a fractional part and processing for truncating a fractional part, and outputs the calculation result as the DC coefficient;
   an intermediate data generating step in which an intermediate data generating unit generates, as intermediate data, a difference value between one input data of the four input data, and the DC coefficient obtained in the DC coefficient generating step; and
   an AC coefficient generating step in which an AC coefficient generating unit to generates three AC coefficients of integers by adding or subtracting the intermediate data generated in the intermediate data generating step to or from three input data except for the one input data,
   wherein the DC coefficient generated in the DC coefficient generating step and the three AC coefficients generated in the AC coefficient generating step are output as lossless-Hadamard transform coefficients.

6. The method according to claim 5, wherein in the intermediate data generating step, a value obtained by subtracting the DC coefficient obtained in the DC coefficient generating step from one input data of the four input data is generated as the intermediate data, and
   in the AC coefficient generating step, three addition results obtained by adding the intermediate data to three input data except for the one input data are output as the AC coefficients.

7. The method according to claim 5, wherein in the intermediate data generating step, a value obtained by subtracting one input data of the four input data from the DC coefficient obtained in the DC coefficient generating step is generated as the intermediate data, and
   in the AC coefficient generating step, three subtraction results obtained by subtracting the intermediate data from three input data except for the one input data are output as the AC coefficients.

* * * * *